United States Patent
Hagiwara et al.

(10) Patent No.: US 12,409,488 B2
(45) Date of Patent: Sep. 9, 2025

(54) METHOD FOR MANUFACTURING BEARING RING MEMBER

(71) Applicant: NSK Ltd., Tokyo (JP)

(72) Inventors: Nobuyuki Hagiwara, Takasaki (JP); Kenji Tezuka, Takasaki (JP)

(*) Notice: Subject to any disclaimer, the term of this patent is extended or adjusted under 35 U.S.C. 154(b) by 0 days.

(21) Appl. No.: 18/712,254

(22) PCT Filed: Nov. 16, 2022

(86) PCT No.: PCT/JP2022/042611
§ 371 (c)(1),
(2) Date: May 22, 2024

(87) PCT Pub. No.: WO2023/095702
PCT Pub. Date: Jun. 1, 2023

(65) Prior Publication Data
US 2025/0010356 A1   Jan. 9, 2025

(30) Foreign Application Priority Data

Nov. 24, 2021 (JP) .................................. 2021-189961
Feb. 2, 2022 (JP) .................................. 2022-015064

(51) Int. Cl.
*B21D 53/10* (2006.01)

(52) U.S. Cl.
CPC .................................. *B21D 53/10* (2013.01)

(58) Field of Classification Search
CPC .......... B21K 1/04; B21D 22/26; B21D 22/28; B21D 53/10; B21D 53/16; B21D 53/12
See application file for complete search history.

(56) References Cited

U.S. PATENT DOCUMENTS

2008/0089631 A1   4/2008   Kobayashi et al.

FOREIGN PATENT DOCUMENTS

| JP | 2006-090407 | 4/2006 |
|----|-------------|--------|
| JP | 2006-097809 | 4/2006 |
| JP | 2006-123003 | 5/2006 |
| JP | 2006-341255 | 12/2006 |
| JP | 2009-226422 | 10/2009 |
| JP | 2010-188355 | 9/2010 |

(Continued)

OTHER PUBLICATIONS

English translation of JP 2020-122569 obtained from espacenet.com (Year: 2020).*

(Continued)

*Primary Examiner* — Moshe Wilensky
(74) *Attorney, Agent, or Firm* — SOEI PATENT & LAW FIRM

(57) ABSTRACT

A method for manufacturing a bearing ring member includes an inversion step of sandwiching a workpiece including a workpiece body portion having an annular shape between a punch disposed on a first side in an axial direction and a die disposed on a second side opposite to the first side, and deforming the workpiece such that the workpiece body portion has a cylindrical shape. The inversion step includes, in the following order, a first step of deforming the workpiece using the punch and the die in a state where no sliding occurs between the workpiece and the die, and a second step of deforming the workpiece using the punch and the die in a state where a sliding occurs between the workpiece and the die.

20 Claims, 9 Drawing Sheets

(a)

(b)

(56) References Cited

FOREIGN PATENT DOCUMENTS

JP   2020-022987   2/2020
JP   2020-122569   8/2020

OTHER PUBLICATIONS

International Search Report dated Feb. 7, 2023 for PCT/JP2022/042611.
International Search Report dated Feb. 7, 2023 for PCT/JP2022/042608.
Hideaki Kudo, "Fundamental Mechanical Engineering Complete Book 3: Plasticity", Morikita Publishing Co., Ltd., May 15, 1968, p. 18-p. 19.
International Preliminary Report on Patentability with Written Opinion dated Jun. 6, 2024 for PCT/JP2022/042611.
International Preliminary Report on Patentability with Written Opinion dated Jun. 6, 2024 for PCT/JP2022/042608.
Soei Patent and Law Firm, Statement of Related Matters, dated Jun. 28, 2024.

\* cited by examiner

METHOD FOR MANUFACTURING BEARING RING MEMBER

CROSS-REFERENCE TO RELATED APPLICATIONS

This application is a 35 U.S.C. § 371 national phase application of PCT/JP2022/042611, filed on Nov. 16, 2022, which claims priority to Japanese Patent Application No. 2021-189961, filed on Nov. 24, 2021 and Japanese Patent Application No. 2022-015064, filed on Feb. 2, 2022.

TECHNICAL FIELD

One aspect of the present disclosure relates to a method for manufacturing a bearing ring member.

BACKGROUND ART

Patent Literature 1 describes a method for manufacturing a ring member, which is used for manufacturing an inner ring or an outer ring of a bearing. In this manufacturing method, the ring member is formed through a step of performing inversion working in which a workpiece having an annular shape is sandwiched between a punch and a die and the direction of a cross section is changed by 90 degrees. Patent Literatures 2 to 5 also describe that a bearing ring member is formed by the same inversion working.

CITATION LIST

Patent Literature

Patent Literature 1: Japanese Unexamined Patent Publication No. 2006-341255
Patent Literature 2: Japanese Unexamined Patent Publication No. 2006-090407
Patent Literature 3: Japanese Unexamined Patent Publication No. 2006-097809
Patent Literature 4: Japanese Unexamined Patent Publication No. 2006-123003
Patent Literature 5: Japanese Unexamined Patent Publication No. 2020-022987

SUMMARY OF INVENTION

Technical Problem

In the above-described manufacturing method, depending on the shape of the workpiece, it may be difficult to satisfactorily perform the inversion working. Examples of such a case include when the thickness of the workpiece is small, when the diameter or width of the workpiece is large or when the workpiece includes a flange portion.

Therefore, an object of one aspect of the present disclosure is to provide a method for manufacturing a bearing ring member by which the inversion working of a workpiece can be satisfactorily performed.

Solution to Problem

According to one aspect of the present disclosure, there is provided a method for manufacturing a bearing ring member, the method including an inversion step of sandwiching a workpiece including a workpiece body portion having an annular shape between a punch disposed on a first side in an axial direction and a die disposed on a second side opposite to the first side, and deforming the workpiece such that the workpiece body portion has a cylindrical shape. The inversion step includes, in the following order, a first step of deforming the workpiece using the punch and the die in a state where no sliding occurs between the workpiece and the die, and a second step of deforming the workpiece using the punch and the die in a state where a sliding occurs between the workpiece and the die.

In the method for manufacturing a bearing ring member, the inversion step includes the first step of deforming the workpiece using the punch and the die in a state where no sliding occurs between the workpiece and the die, and the second step of deforming the workpiece using the punch and the die in a state where a sliding occurs between the workpiece and the die. Accordingly, in the first step, since no sliding occurs between the workpiece and the die, the workpiece can be satisfactorily stood up. In addition, in the second step, since the workpiece slides on the die, for example, the occurrence of unintended deformation such as the workpiece being bent can be suppressed. Therefore, according to the method for manufacturing a bearing ring member, the inversion working of the workpiece can be satisfactorily performed.

A bending moment acting on the workpiece in the first step may be smaller than a predicted value M of a limiting bending moment of the workpiece body portion calculated by Formula (1). In this case, no sliding occurs between the workpiece and the die in the first step, and the workpiece can be satisfactorily stood up.

[Formula 1]

$$M = \frac{W_W \times t^2}{4} Y \tag{1}$$

In Formula (1), $W_W$ is a width of the workpiece body portion, t is a thickness of the workpiece body portion, and Y is a yield stress of the workpiece body portion.

In the second step, a second die different from a first die that is the die used in the first step may be used. In this case, satisfactory inversion working as described above can be realized by using different dies in the first step and the second step.

The first die may include a first die R surface formed in a circular arc shape, and the second die may include a second die R surface formed in a circular arc shape, and an inclined surface formed on the second side of the second die R surface and inclined with respect to the axial direction. In the first step, the first die R surface may come into contact with the workpiece, and in the second step, after the second die R surface comes into contact with the workpiece, the inclined surface may come into contact with the workpiece. In this case, the workpiece can slide on the inclined surface in the second step, and satisfactory inversion working as described above can be realized.

The first die may include a first die body portion formed in a columnar shape, and the second die may include a second die body portion formed in a columnar shape. In the first step, the workpiece may be sandwiched between the punch and the first die body portion, and in the second step, the workpiece may be sandwiched between the punch and the second die body portion. A diameter of the second die body portion may be smaller than a diameter of the first die body portion. In this case, the workpiece easily slides on the second die in the second step, so that satisfactory inversion working as described above can be realized.

In the first step, the workpiece may be sandwiched between the punch and the first die in a state where a surface of the workpiece faces one of the first side and the second side, and in the second step, the workpiece may be sandwiched between the punch and the second die in a state where the surface of the workpiece faces the other of the first side and the second side. In this case as well, satisfactory inversion working as described above can be realized.

A surface roughness of a second contact surface of the second die which comes into contact with the workpiece in the second step may be smaller than a surface roughness of a first contact surface of the first die which comes into contact with the workpiece in the first step. In this case, the workpiece easily slides on the second die in the second step, so that satisfactory inversion working as described above can be realized.

A Rockwell C scale hardness of a second contact surface of the second die which comes into contact with the workpiece in the second step may be larger than a Rockwell C scale hardness of a first contact surface of the first die which comes into contact with the workpiece in the first step. In this case, the workpiece easily slides on the second die in the second step, so that satisfactory inversion working as described above can be realized.

In the second step, the workpiece may be sandwiched between the punch and the die while the workpiece is pushed toward a side of the punch along a radial direction by a pushing member. In this case, the workpiece easily slides on the die in the second step, so that satisfactory inversion working as described above can be realized.

In the second step, a hook punch including a hook portion may be used, and the workpiece may be sandwiched between the hook punch and the die by hooking the hook portion onto the workpiece. In this case, the workpiece easily slides on the die in the second step, so that satisfactory inversion working as described above can be realized.

The workpiece may further include an inner flange portion extending from a radially inner edge of the workpiece body portion toward one side in the axial direction, and an outer flange portion extending from a radially outer edge of the workpiece body portion toward the one side in the axial direction. When the workpiece has such a shape, there is a concern that it is difficult to satisfactorily perform inversion working; however, according to the method for manufacturing a bearing ring member, even in such a case, the inversion working of the workpiece can be satisfactorily performed.

Advantageous Effects of Invention

According to one aspect of the present disclosure, it is possible to provide the method for manufacturing a bearing ring member by which the inversion working of the workpiece can be satisfactorily performed.

DESCRIPTION OF EMBODIMENTS

Hereinafter, an embodiment of the present disclosure will be described in detail with reference to the drawings. In the following description, the same reference signs are used for the same or corresponding elements, and duplicate descriptions will be omitted.

Figure 1:
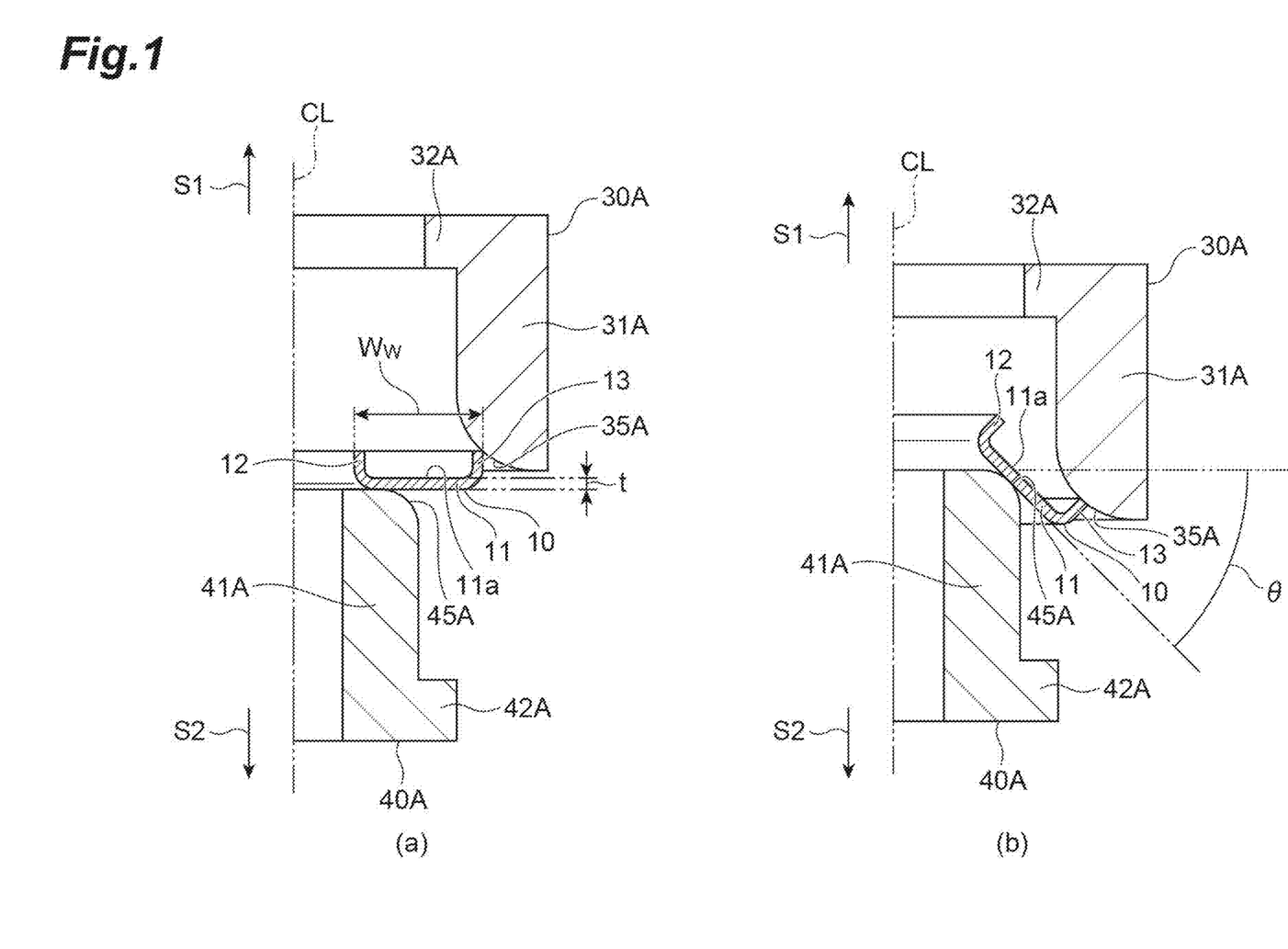
FIGS. 1(a) and 1(b) are cross-sectional views for describing a first step of an inversion step.
Figure 2:
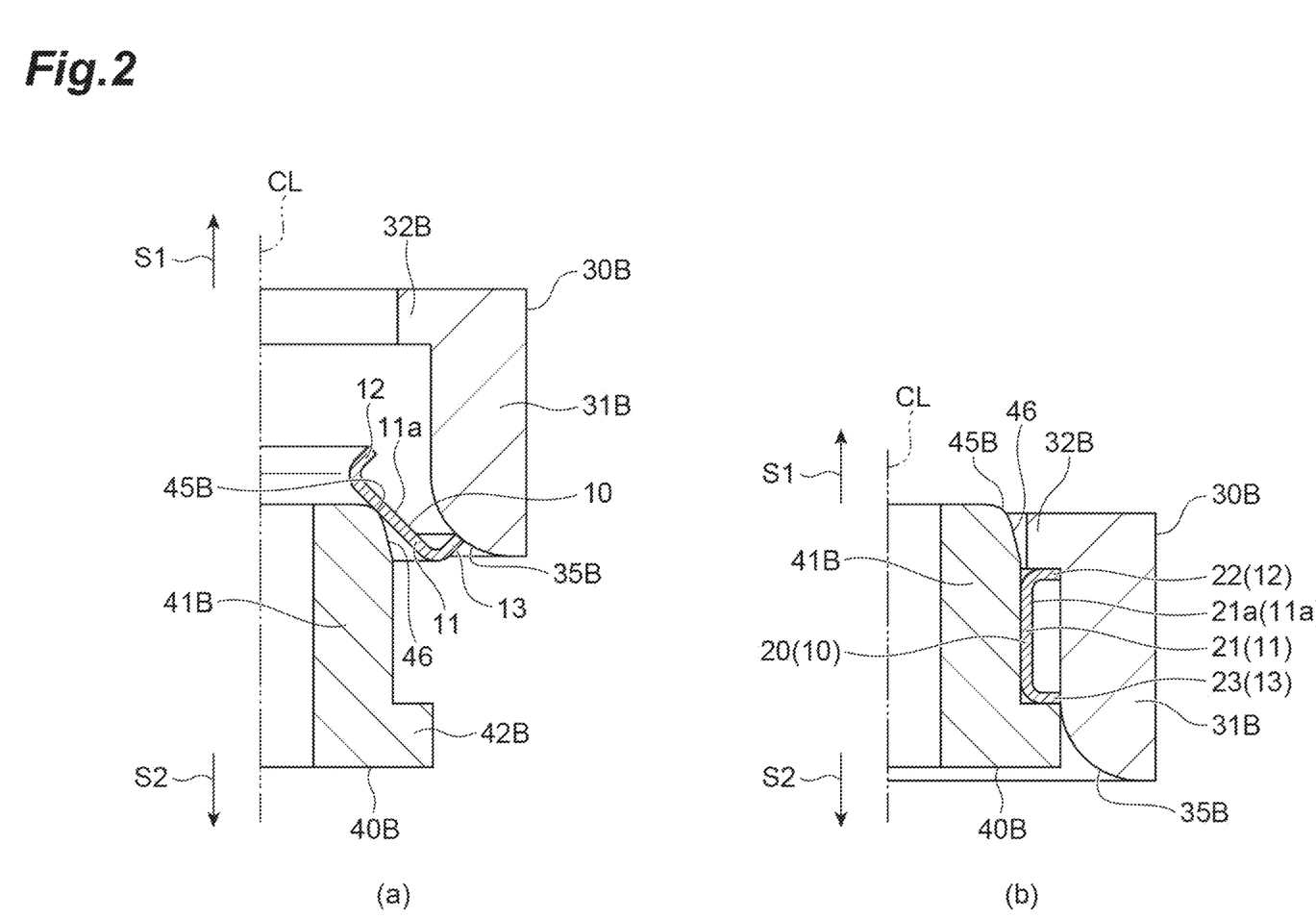
FIGS. 2(a) and 2(b) are cross-sectional views for describing a second step of the inversion step.

In a method for manufacturing a bearing ring member according to the embodiment, as shown in FIGS. 1 and 2, a bearing ring member 20 is manufactured from a workpiece 10. FIGS. 1 and 2 show cross sections of the workpiece 10 and the ring member 20 which are parallel to an axial direction (a direction parallel to a central axis CL). In this example, the workpiece 10 and the ring member 20 have a substantially U-shaped cross-sectional shape.

The ring member 20 is, for example, an inner ring member that can be used as an inner ring of a bearing. The manufactured ring member 20 itself may be used as an inner ring, or an inner ring may be manufactured by further processing the ring member 20. The bearing to which the ring member 20 is applied may be any type of bearing, for example, a needle bearing, a cylindrical roller bearing, a tapered roller bearing, a ball bearing, or the like.

The ring member 20 includes a main body portion 21 and a pair of flange portions 22 and 23. The main body portion 21 is formed in a cylindrical shape, and has a cylindrical raceway surface 21a facing the outside in a radial direction. One flange portion 22 extends outward in the radial direction from an end portion on a first side S1 (upper side in FIG. 2) of the main body portion 21 in the axial direction, and the other flange portion 23 extends outward in the radial direction from an end portion on a second side S2 (side opposite to the first side S1) of the main body portion 21. Each of the flange portions 22 and 23 is formed, for example, in a substantially annular plate shape.

The workpiece 10 includes a workpiece body portion 11, an inner flange portion 12, and an outer flange portion 13. The workpiece body portion 11 is formed in an annular plate shape, and has a surface 11a that becomes the raceway surface 21a of the ring member 20. In this example, the surface 11a is an annular flat surface. The inner flange portion 12 extends from a radially inner edge of the workpiece body portion 11 toward one side (upper side in FIG. 1) in the axial direction, and the outer flange portion 13 extends from a radially outer edge of the workpiece body portion 11 toward the one side in the axial direction. Namely, the inner flange portion 12 and the outer flange portion 13 protrude from the workpiece body portion 11 toward the same side. Each of the inner flange portion 12 and the outer flange portion 13 is formed, for example, in a substantially cylindrical shape.

The method for manufacturing a bearing ring member of the embodiment includes an inversion step of sandwiching the workpiece 10 between a punch and a die, and deforming the workpiece 10 such that the workpiece body portion 11 has a cylindrical shape. The direction of a cross section of the workpiece 10 is changed by 90 degrees through the inversion step to form the workpiece body portion 11 having an annular plate shape into a cylindrical shape, so that the ring member 20 is formed. The inversion step includes a first step of deforming the workpiece 10 from an initial shape to a predetermined intermediate shape (FIG. 1), and a second step of deforming the workpiece 10 from the intermediate shape to a final shape (FIG. 2).

As shown in FIG. 1, in the first step, a first punch 30A and a first die 40A are used. The first punch 30A and the first die 40A have the common central axis CL, and each of the first punch 30A and the first die 40A has a uniform cross-sectional shape in the radial direction.

The first punch 30A includes a first punch body portion 31A and a first punch protruding portion 32A. The first punch body portion 31A is formed in a substantially cylindrical shape having an axis parallel to the axial direction. A first punch R surface 35A is formed at an inner edge portion on the second side S2 of the first punch body portion 31A. The first punch R surface 35A is a curved surface formed by rounding a corner on the second side S2 of the first punch body portion 31A, and is formed in a circular arc shape in a cross section parallel to the axial direction (FIG. 1). The first punch protruding portion 32A is formed on the first side S1 of the first punch body portion 31A, and protrudes inward from the first punch body portion 31A in the radial direction. The first punch protruding portion 32A is formed, for example, in a cylindrical shape.

The first die 40A includes a first die body portion 41A and a first die protruding portion 42A. The first die body portion 41A is formed in a substantially columnar shape having an axis parallel to the axial direction. A first die R surface 45A is formed at an outer edge portion on the first side S1 of the first die body portion 41A. The first die R surface 45A is a curved surface formed by rounding a corner on the first side S1 of the first die body portion 41A, and is formed in a circular arc shape in a cross section parallel to the axial direction (FIG. 1). The first die protruding portion 42A is formed on the second side S2 of the first die body portion 41A, and protrudes outward in the radial direction from the first die body portion 41A. The first die protruding portion 42A is formed, for example, in a cylindrical shape. Incidentally, in the present specification, the first punch body portion 31A has a cylindrical shape, and the fact that the first die body portion 41A has a columnar shape means that the first die body portion 41A is formed in a substantially columnar shape to sandwich the workpiece 10 between the first die body portion 41A and the first punch body portion 31A from the inside in the radial direction, and includes a case where the first die body portion 41A includes, for example, a hollow portion on the central axis CL as shown in FIG. 1. This point also applies to a second die body portion 41B.

As shown in FIG. 2, in the second step, a second punch 30B and a second die 40B are used. The second punch 30B and the second die 40B have the common central axis CL, and each of the second punch 30B and the second die 40B has a uniform cross-sectional shape in the radial direction. In this example, the second punch 30B is the same as the first punch 30A, and the second die 40B is different from the first die 40A. The second punch 30B includes a second punch body portion 31B that is the same as the first punch body portion 31A, and a second punch protruding portion 32B that is the same as the first punch protruding portion 32A. The second punch body portion 31B has a second punch R surface 35B corresponding to the first punch R surface 35A.

The second die 40B includes the second die body portion 41B and a second die protruding portion 42B. The second die body portion 41B is formed in a substantially columnar shape having an axis parallel to the axial direction. The second die body portion 41B has the same configuration as the first die body portion 41A, except that the second die body portion 41B has an inclined surface 46. Namely, the second die body portion 41B has a second die R surface 45B and the inclined surface 46. The second die R surface 45B is formed at an outer edge portion on the first side S1 of the second die body portion 41B. The second die R surface 45B is a curved surface formed by rounding a corner on the first side S1 of the second die body portion 41B, and is formed in a circular arc shape in a cross section parallel to the axial direction (FIG. 2).

The inclined surface (tapered surface) 46 is formed on the second side S2 of the second die R surface 45B. The inclined surface 46 is inclined with respect to the axial direction to be further away from the central axis CL as the inclined surface 46 extends toward the second side S2. The second die protruding portion 42B is formed on the second side S2 of the second die body portion 41B, and protrudes outward in the radial direction from the second die body portion 41B. The second die protruding portion 42B is formed, for example, in the same cylindrical shape as the first die protruding portion 42A.

In the inversion step, first, as shown in FIG. 1, the workpiece 10 is sandwiched between the first punch 30A and the first die 40A, and the workpiece 10 is deformed to stand up toward the outside in the radial direction (first step). At the start of the first step, the first punch 30A is disposed on the first side S1 with respect to the first die 40A, and the first die 40A is disposed on the second side S2 with respect to the first punch 30A (FIG. 1(a)). Then, by moving (descending) the first punch 30A in the axial direction to bring the first punch 30A closer to the first die 40A, the workpiece 10 is sandwiched between the first punch 30 and the first die 40A, and the workpiece 10 is deformed to stand up toward the outside in the radial direction (FIG. 1(b)). In the first step, the first punch R surface 35A and the first die R surface 45A come into contact with the workpiece 10. In the first step, the workpiece 10 is sandwiched between the first punch body portion 31A and the first die body portion 41A in a state where the surface 11a of the workpiece 10 faces the first side S1.

In the first step, the workpiece 10 is deformed by the first punch 30A and the first die 40A in a state where no sliding occurs between the workpiece 10 and the first die 40A (first die R surface 45A). Accordingly, the workpiece 10 can be satisfactorily stood up. Whether or not sliding occurs can be determined using a predicted value M of a limiting bending moment of the workpiece 10 to be described below.

When a bending moment (maximum bending moment) acting on the workpiece 10 in the first step is smaller than the predicted value M of the limiting bending moment of the workpiece 10 calculated by the following formula (2), no sliding occurs between the workpiece 10 and the first die 40A, and the workpiece 10 stands up without sliding on the first die 40A in the first step.

[Formula 2]

$$M = \frac{W_W \times t^2}{4} Y \quad (2)$$

In Formula (2), $W_W$ is a width of the workpiece body portion 11, t is a thickness of the workpiece body portion 11, and Y is a yield stress of the workpiece 10. In this example, the width of the workpiece body portion 11 is a length between an inner edge of the inner flange portion 12 and an outer edge of the outer flange portion 13 in the radial direction. The yield stress is a boundary stress that determines whether or not plastic deformation occurs in a material. When a stress larger than the yield stress acts, the material undergoes plastic deformation, and when a stress smaller than the yield stress acts, the material undergoes elastic deformation. Formula (2) is described, for example, in Hideaki Kudo's "Fundamental Mechanical Engineering Complete Book 3: Plasticity", published by Morikita Publishing Co., Ltd., First edition, first printing on May 15, 1968, and First edition, 18th printing on Mar. 3, 1995. For example, a bending moment acting on the workpiece 10 can be theoretically calculated by calculating strain generated in the workpiece 10 from the amount of change in the width of the workpiece 10 (workpiece body portion 11) in the inversion step, calculating stress from the strain, calculating energy from the stress, and calculating a bending moment from the energy.

Figure 3:
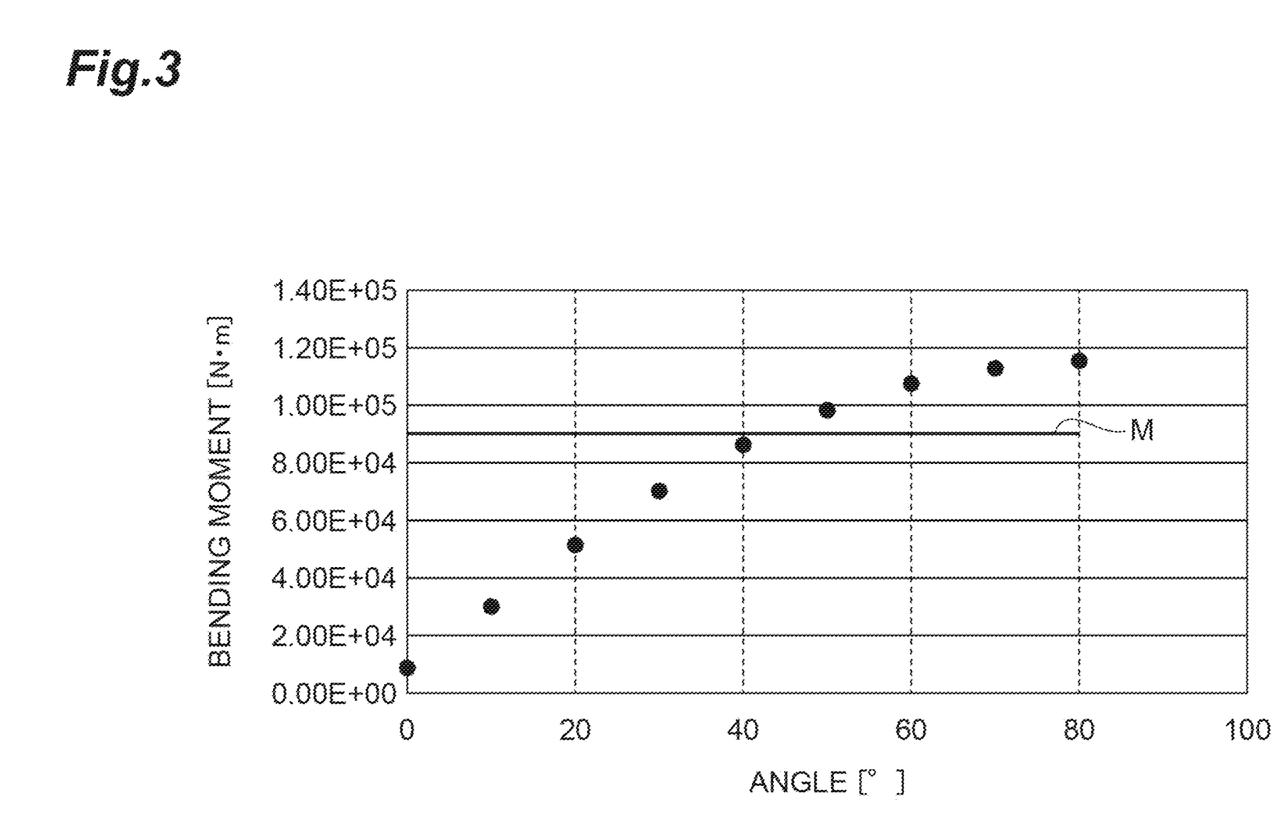
FIG. 3 is a graph showing an example of a bending moment acting on a workpiece in the inversion step.

FIG. 3 is a graph showing an example of the bending moment acting on the workpiece 10 in the inversion step. The horizontal axis in FIG. 3 represents an inclination angle θ (°) of the workpiece 10 (workpiece body portion 11) with respect to a horizontal direction (a direction perpendicular to the axial direction) (refer to FIG. 1(b)), and the vertical axis represents the bending moment (N·m) acting on the workpiece 10. As shown in FIG. 3, in this example, the bending moment is smaller than the predicted value M of the limiting bending moment within a range where the inclination angle θ is 0 degrees or more and approximately 40 degrees or less. In this case, no sliding occurs between the workpiece 10 and the first die 40A within this range.

In order to satisfactorily perform the inversion working of the workpiece 10, the workpiece 10 needs to start sliding with respect to the die within a range where the bending moment acting on the workpiece 10 is smaller than the predicted value M of the limiting bending moment. In this example, the bending moment (maximum bending moment) acting on the workpiece 10 in the first step is smaller than the predicted value M of the limiting bending moment of the workpiece 10. In other words, the shapes of the first punch 30A and the first die 40A, the descending stroke of the first punch 30A, and the like are determined such that the bending moment acting on the workpiece 10 in the first step is smaller than the predicted value M. Accordingly, in the first step, no sliding occurs between the workpiece 10 and the first die 40A, and the workpiece 10 can be satisfactorily stood up. As will be described below, in the second step, the workpiece 10 can slide on the second die 40B, and the workpiece 10 can be satisfactorily deformed.

In the second step, as shown in FIG. 2, the workpiece 10 after processing in the first step is sandwiched between the second punch 30B and the second die 40B, and the workpiece 10 is deformed such that the workpiece body portion 11 has a cylindrical shape. In this example, the workpiece 10 is deformed such that the surface 11a of the workpiece body portion 11 faces the outside in the radial direction. In the second step, first, the workpiece 10 is sandwiched between the second punch R surface 35B and the second die R surface 45B (FIG. 2(a)). Thereafter, the workpiece 10 is sandwiched between the second punch R surface 35B and the inclined surface 46. In such a manner, in the second step, after the second die R surface 45B comes into contact with the workpiece 10, the inclined surface 46 comes into contact with the workpiece 10.

Thereafter, when the second punch 30B further descends, the second punch protruding portion 32B comes into contact with the inner flange portion 12 of the workpiece 10, and the workpiece 10 is pushed toward the second side S2 by the second punch protruding portion 32B. Thereafter, the workpiece 10 is disposed between the second punch body portion 31B and the second die body portion 41B (FIG. 2(b)). Through the above-described steps, the workpiece body portion 11, the inner flange portion 12, and the outer flange portion 13 of the workpiece 10 become the main body portion 21, the flange portion 22, and the flange portion 23 of the ring member 20, respectively, so that the ring member 20 is obtained.

In the second step, the workpiece 10 is deformed by the second punch 30B and the second die 40B in a state where sliding occurs between the workpiece 10 and the second die 40B (the second die R surface 45B and the inclined surface 46). Accordingly, for example, the occurrence of unintended deformation such as the workpiece 10 being bent can be suppressed. Namely, when no sliding occurs between the workpiece 10 and the second die 40B in the second step, there is a risk that the workpiece 10 may be bent into an unintended shape; however, since sliding occurs between the workpiece 10 and the second die 40B in the second step, the occurrence of such deformation can be suppressed. Incidentally, in both the first step and the second step, no sliding occurs between the workpiece 10 and each of the first punch 30A and the second punch 30B.

[Actions and Effects]

In the method for manufacturing a bearing ring member of the embodiment, the inversion step includes the first step of deforming the workpiece 10 using the first punch 30A and the first die 40A in a state where no sliding occurs between the workpiece 10 and the first die 40A, and the second step of deforming the workpiece 10 using the second punch 30B and the second die 40B in a state where sliding occurs between the workpiece 10 and the second die 40B. Accordingly, in the first step, since no sliding occurs between the workpiece 10 and the first die 40A, the workpiece 10 can be satisfactorily stood up. In addition, in the second step, since the workpiece 10 slides on the second die 40B, for example, the occurrence of unintended deformation such as the workpiece 10 being bent can be suppressed. Therefore, according to the method for manufacturing a bearing ring member of the embodiment, the inversion working of the workpiece 10 can be satisfactorily performed.

The bending moment acting on the workpiece 10 in the first step is smaller than the predicted value M of the limiting bending moment of the workpiece body portion 11 calculated by Formula (2). Accordingly, no sliding occurs between the workpiece 10 and the first die 40A in the first step, and the workpiece 10 can be satisfactorily stood up.

In the second step, the second die 40B different from the first die 40A used in the first step is used. Accordingly, satisfactory inversion working as described above can be realized by using different dies in the first step and the second step.

In the first step, the first die R surface 45A comes into contact with the workpiece 10, and in the second step, after the second die R surface 45B comes into contact with the workpiece 10, the inclined surface 46 comes into contact with the workpiece 10. Accordingly, the workpiece 10 can slide on the inclined surface 46 in the second step, and satisfactory inversion working as described above can be realized.

The workpiece 10 includes the inner flange portion 12 extending from the radially inner edge of the workpiece body portion 11 toward the one side in the axial direction, and the outer flange portion 13 extending from the radially outer edge of the workpiece body portion 11 toward the one side in the axial direction. When the workpiece 10 has such a shape, there is a risk that it is difficult to satisfactorily perform inversion working; however, according to the method for manufacturing a bearing ring member of the embodiment, even in such a case, the inversion working of the workpiece 10 can be satisfactorily performed.

[Modification Examples]

Figure 4:
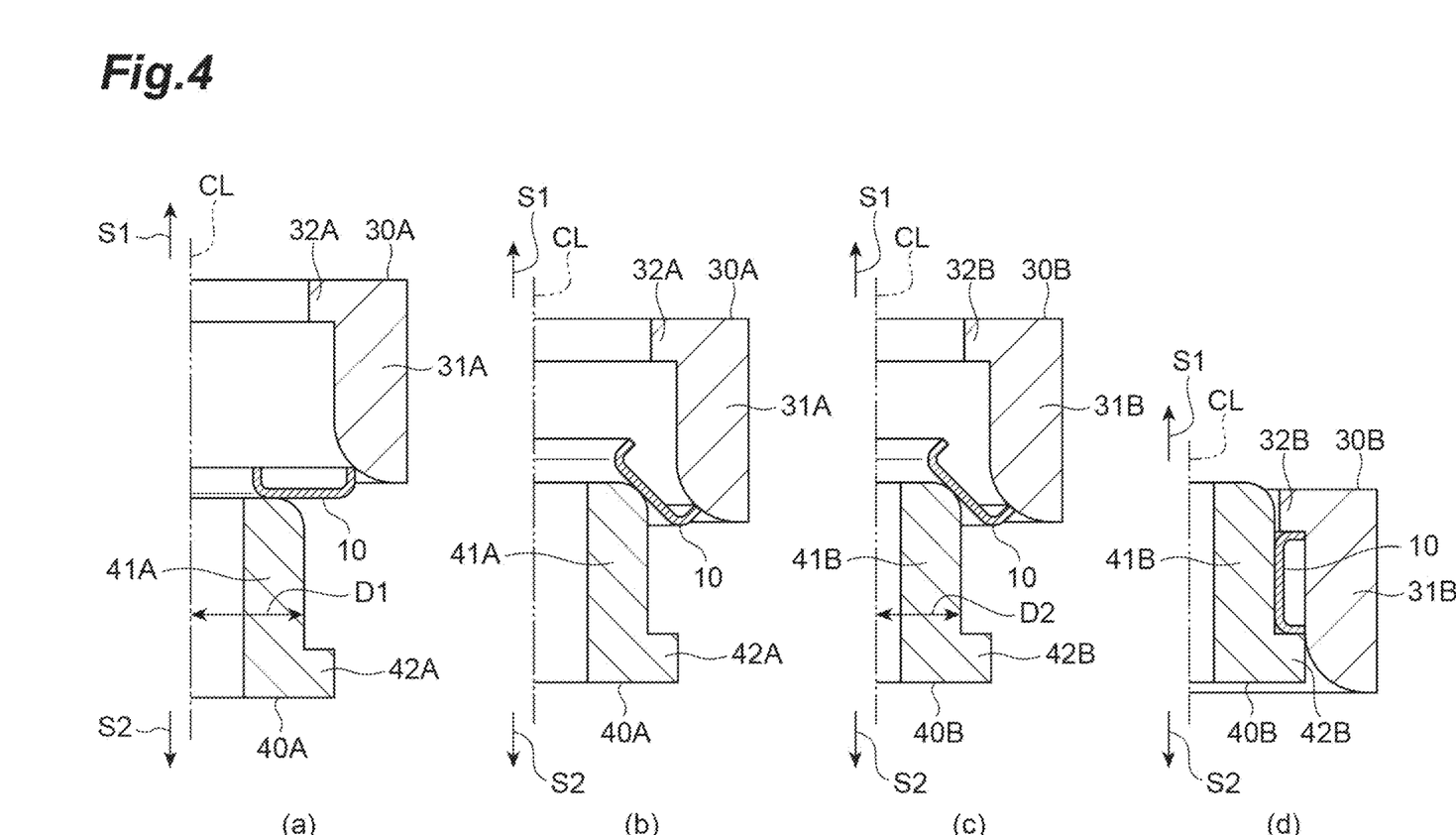
FIGS. 4(a) to 4(d) are cross-sectional views for describing a first step and a second step of a first modification example.

FIG. 4 is a cross-sectional view for describing a first step and a second step of a first modification example. The first step of the first modification example is the same as the first step of the embodiment. In the first modification example, the second die body portion 41B of the second die 40B does not include the inclined surface 46. A diameter D2 of the second die body portion 41B is smaller than a diameter D1 of the first die body portion 41A.

In the first modification example as well, similarly to the embodiment, the inversion working of the workpiece 10 can be satisfactorily performed. In addition, since the diameter D2 of the second die body portion 41B is smaller than the diameter D1 of the first die body portion 41A, the workpiece 10 easily slides on the second die 40B in the second step, so that satisfactory inversion working can be realized.

Figure 5:
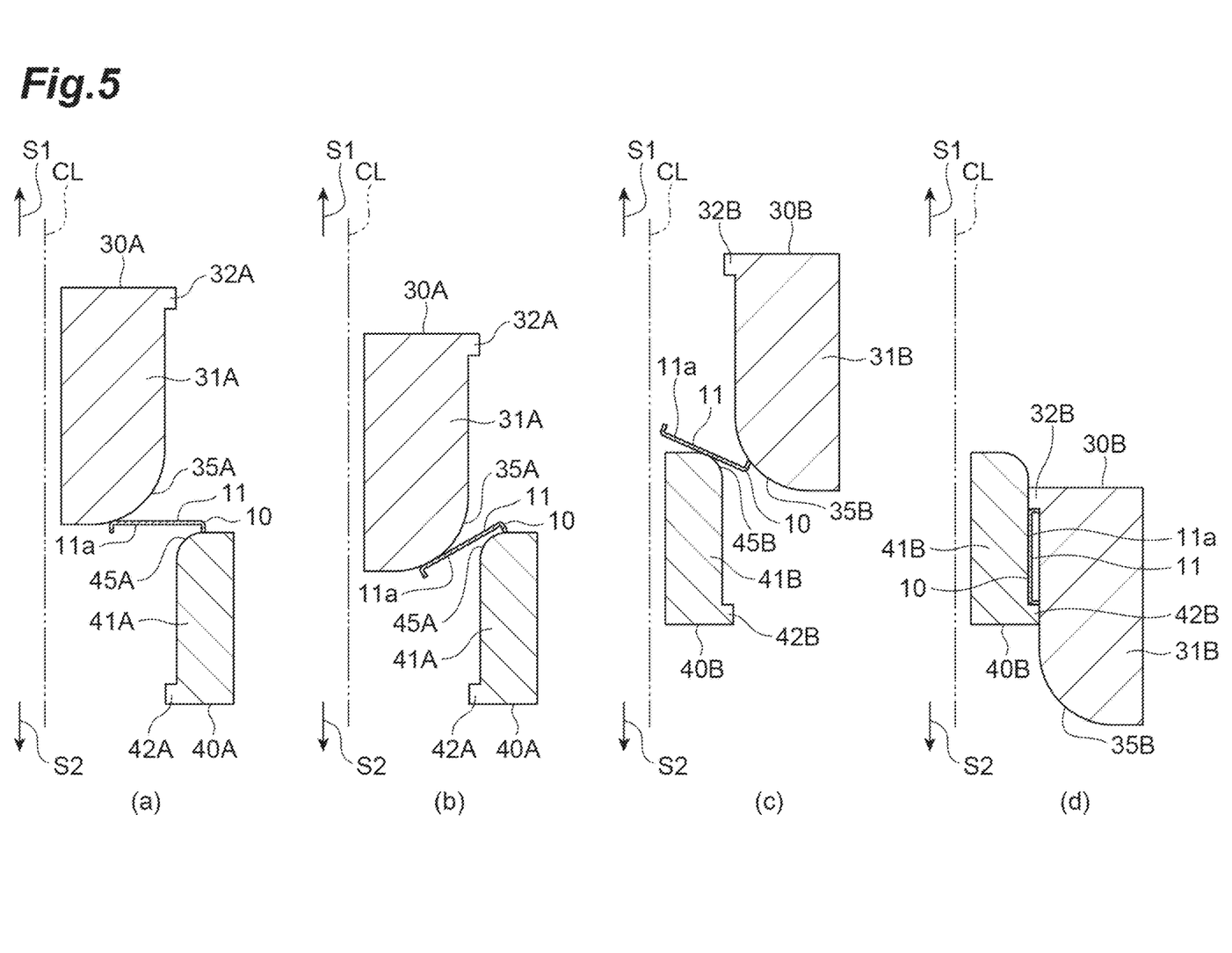
FIGS. 5(a) to 5(d) are cross-sectional views for describing a first step and a second step of a second modification example.

FIG. 5 is a cross-sectional view for describing a first step and a second step of a second modification example. In the second modification example, contrary to the embodiment, the first punch body portion 31A of the first punch 30A is formed in a substantially columnar shape, and the first die body portion 41A of the first die 40A is formed in a substantially cylindrical shape. Similarly to the embodiment, the second punch body portion 31B of the second punch 30B is formed in a substantially cylindrical shape, and the second die body portion 41B of the second die 40B is formed in a substantially columnar shape. Similarly to the first modification example, the second die body portion 41B does not include the inclined surface 46.

In the first step of the second modification example, the workpiece 10 is sandwiched between the first punch body portion 31A and the first die body portion 41A in a state where the surface 11a of the workpiece 10 faces the second side S2. In the second step, the workpiece 10 is sandwiched between the second punch body portion 31B and the second die body portion 41B in a state where the surface 11a of the workpiece 10 faces the first side S1. Namely, in the second modification example, a step of inverting the direction of the workpiece 10 in the axial direction is included between the first step and the second step, and the direction of the workpiece 10 in the axial direction is opposite between the first step and the second step.

In the second modification example as well, similarly to the embodiment, the inversion working of the workpiece 10 can be satisfactorily performed. Incidentally, in the second modification example, the first punch body portion 31A and the second die body portion 41B may be formed in a substantially cylindrical shape, and the first die body portion 41A and the second punch body portion 31B may be formed in a substantially columnar shape. Alternatively, the first punch body portion 31A and the second punch body portion 31B may be formed in a substantially cylindrical shape, and the first die body portion 41A and the second die body portion 41B may be formed in a substantially columnar shape. On the contrary, the first punch body portion 31A and the second punch body portion 31B may be formed in a substantially columnar shape, and the first die body portion 41A and the second die body portion 41B may be formed in a substantially cylindrical shape. In addition, the direction of the workpiece 10 in the axial direction may be opposite between the first step and the second step; in the first step, the workpiece 10 may be sandwiched between the first punch body portion 31A and the first die body portion 41A in a state where the surface 11a of the workpiece 10 faces the first side S1, and in the second step, the workpiece 10 may be sandwiched between the second punch body portion 31B and the second die body portion 41B in a state where the surface 11a of the workpiece 10 faces the second side S2.

Figure 6:
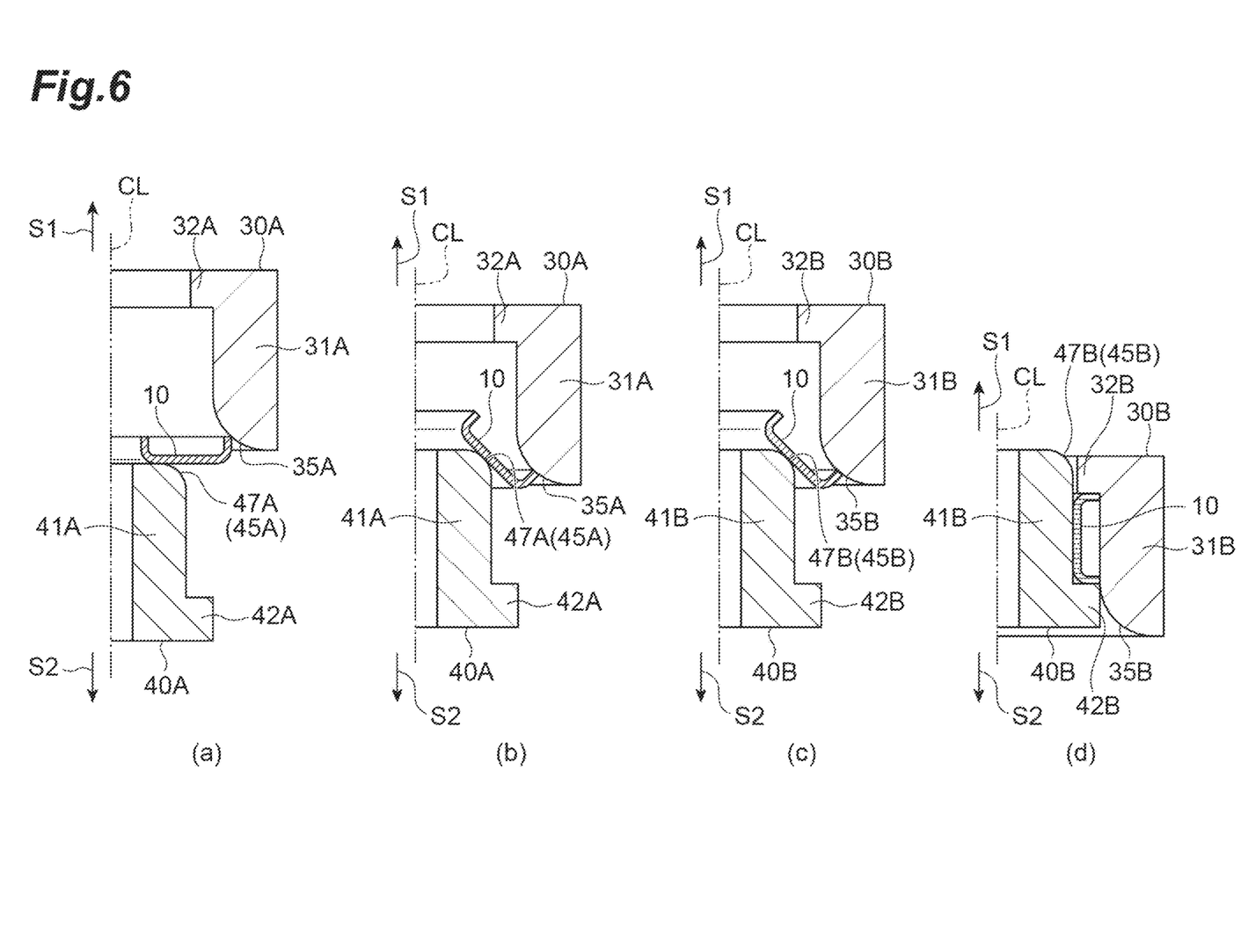
FIGS. 6(a) to 6(d) are cross-sectional views for describing a first step and a second step of a third modification example and a fourth modification example.

FIG. 6 is a cross-sectional view for describing a first step and a second step of a third modification example and a fourth modification example. In the third modification example, a surface roughness of a second contact surface 47B of the second die 40B which comes into contact with the workpiece 10 in the second step is smaller than a surface roughness of a first contact surface 47A of the first die 40A which comes into contact with the workpiece 10 in the first step. The surface roughness is an arithmetic average roughness Ra (JIS B 0601 4.2.1). Similarly to the first modification example, the second die body portion 41B of the third modification example does not include the inclined surface 46. In this example, the first contact surface 47A is the first die R surface 45A, and the second contact surface 47B is the second die R surface 45B. The surface roughness of the first contact surface 47A can be adjusted, for example, by forming a mill scale film or performing lathing or grinding (forming lathe marks or grinding marks). The surface roughness of the second contact surface 47B can be adjusted, for example, by performing grinding or lapping or forming a coating layer. By selectively performing these processes, the surface roughness of the first contact surface 47A and the second contact surface 47B can be adjusted such that the surface roughness of the second contact surface 47B is smaller than the surface roughness of the first contact surface 47A.

In the third modification example as well, similarly to the embodiment, the inversion working of the workpiece 10 can be satisfactorily performed. In addition, since the surface roughness of the second contact surface 47B is smaller than the surface roughness of the first contact surface 47A, the workpiece 10 easily slides on the second die 40B in the second step, so that satisfactory inversion working can be realized.

Subsequently, the fourth modification example will be described with reference to FIG. 6. In the fourth modification example, instead of adjusting the surface roughness of the first contact surface 47A and the second contact surface 47B, the Rockwell C scale hardness is adjusted. Specifically, a Rockwell C scale hardness of the second contact surface 47B is larger than a Rockwell C scale hardness of the first contact surface 47A. The fourth modification example is the same as the third modification example except for this point. In this example, by making the first die R surface 45A from a material prone to wear, whereas making the second die R surface 45B from a material resistant to wear, the Rockwell C scale hardness of the second contact surface 47B is made larger than the Rockwell C scale hardness of the first contact surface 47A. The material of the first contact surface 47A may be, for example, steel, die steel (for example, SKD11), or the like. The material of the second contact surface 47B may be, for example, cemented carbide, high-speed steel (for example, SKH51), or the like. The Rockwell C scale hardness of the second contact surface 47B may be adjusted by forming a coating layer on the second contact surface 47B. The Rockwell C scale hardness is a hardness defined by JIS Z 2245.

In the fourth modification example as well, similarly to the embodiment, the inversion working of the workpiece 10 can be satisfactorily performed. In addition, since the Rockwell C scale hardness of the second contact surface 47B is larger than the Rockwell C scale hardness of the first contact surface 47A, the workpiece 10 easily slides on the second die 40B in the second step, so that satisfactory inversion working can be realized.

Figure 7:
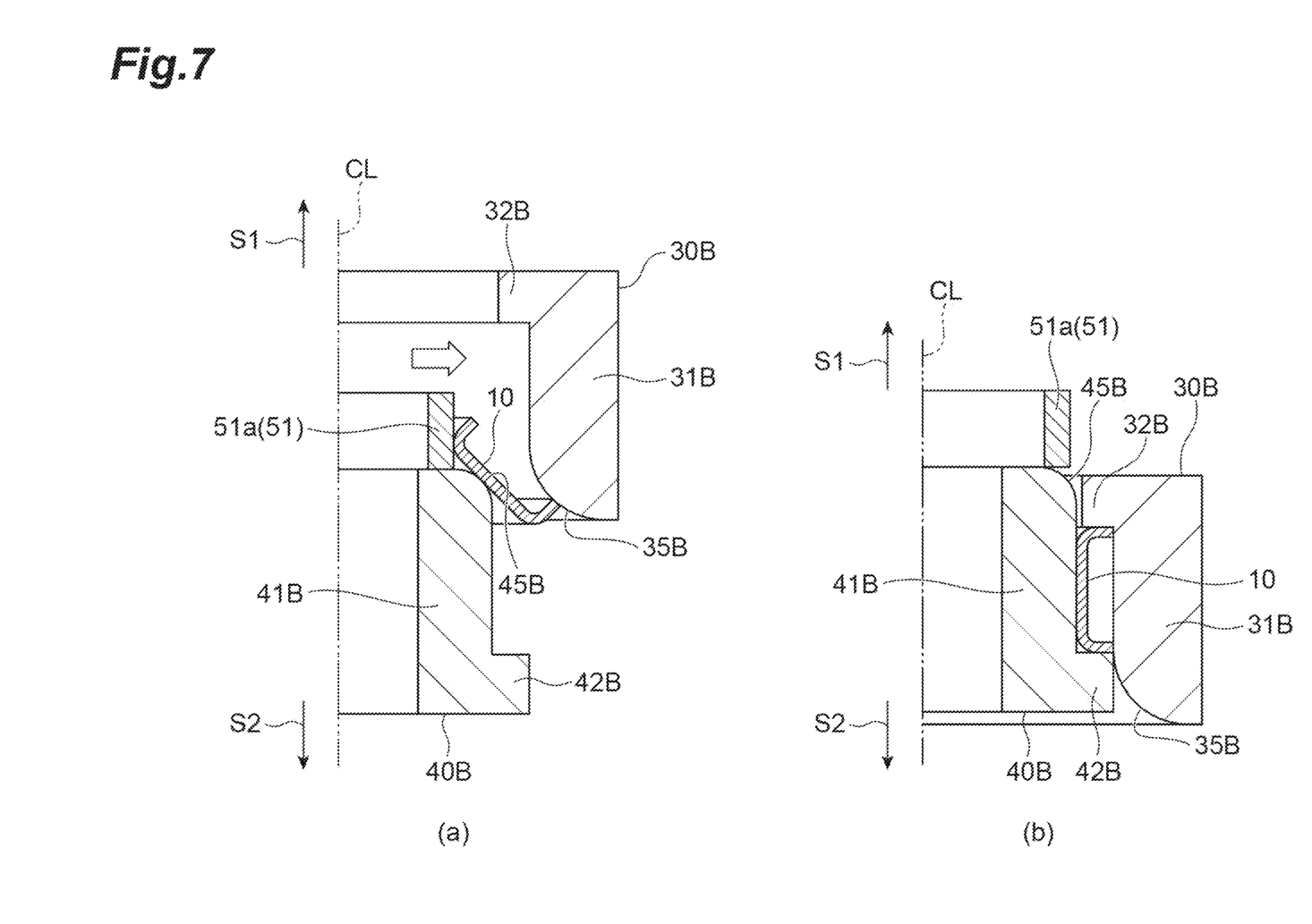
FIGS. 7(a) and 7(b) are cross-sectional views for describing a second step of a fifth modification example.

FIG. 7 is a cross-sectional view for describing a second step of a fifth modification example. For example, a first step of the fifth modification example is the same as the first step of the embodiment. In the second step of the fifth modification example, the workpiece 10 is sandwiched between the second punch 30B and the second die 40B while the workpiece 10 is pushed from the inside toward the outside in the radial direction (while the workpiece 10 is pushed toward a second punch 30B side along the radial direction) by a pushing member 51. The pushing member 51 includes, for example, a plurality of (for example, eight) block members 51a arranged along a circumferential direction. Each block member 51a is disposed on the second die 40B, and is movable in the radial direction along the second die 40B. As the block members 51a moves outward in the radial direction, the pushing member 51 pushes the workpiece 10 outward in the radial direction. As the pushing force, for example, a force from any mechanism or power source such as a spring, hydraulic pressure, air, a motor, or a cam may be used. Similarly to the first modification example, the second die body portion 41B of the fifth modification example does not include the inclined surface 46.

In the fifth modification example as well, similarly to the embodiment, the inversion working of the workpiece 10 can be satisfactorily performed. In addition, since the workpiece 10 is sandwiched between the second punch 30B and the second die 40B while the workpiece 10 is pushed toward the second punch 30B along the radial direction by the pushing member 51, the workpiece 10 easily slides on the second die 40B in the second step, so that satisfactory inversion working can be realized. Incidentally, in the fifth modification example, the first punch body portion 31A and the second punch body portion 31B may be formed in a substantially columnar shape, and the first die body portion 41A and the second die body portion 41B may be formed in a substantially cylindrical shape. In this case, in the second step, the workpiece 10 may be sandwiched between the second punch 30B and the second die 40B while the workpiece 10 is pushed from the outside toward the inside in the radial direction (while the workpiece 10 is pushed toward the second punch 30B side along the radial direction) by the pushing member 51.

Figure 8:
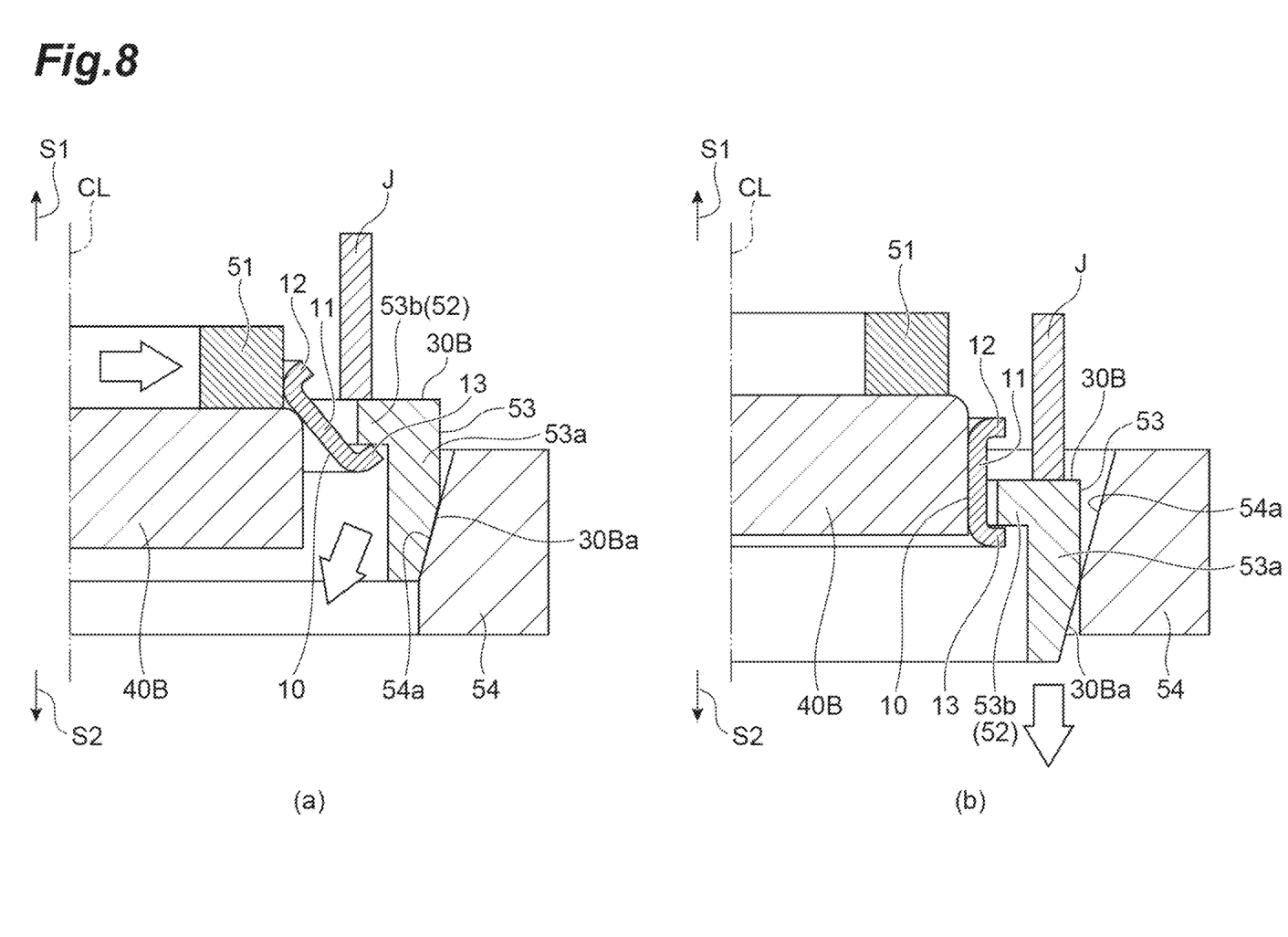
FIGS. 8(a) and 8(b) are cross-sectional views for describing a second step of a sixth modification example.

FIG. 8 is a cross-sectional view for describing a second step of a sixth modification example. For example, a first step of the sixth modification example is the same as the first step of the embodiment. In the second step of the sixth modification example, the second punch 30B (hook punch) including a hook portion 52 is used, and the workpiece 10 is sandwiched between the second punch 30B and the second die 40B by hooking the hook portion 52 onto the workpiece 10. The second punch 30B includes a plurality of (for example, eight) divided portions 53 arranged along the circumferential direction. Each divided portion 53 is movable in the radial direction.

In this example, the hook portion 52 is provided in each divided portion 53. Namely, each divided portion 53 includes a main body portion 53a and a protruding portion 53b protruding inward in the radial direction from an end portion on the first side S1 of the main body portion 53a, and the protruding portion 53b functions as the hook portion 52. In other words, the hook portion 52 includes a plurality of portions (protruding portions 53b) arranged along the circumferential direction.

In the second step, the hook portion 52 moves toward the lower side (second side S2) while moving inward in the radial direction. Specifically, a cam 54 is disposed below the second punch 30B. The cam 54 has a guide surface 54a inclined to face the second punch 30B. The second punch 30B (each divided portion 53) has an inclined surface 30Ba corresponding to the guide surface 54a. The inclined surface 30Ba and the guide surface 54a are inclined to approach the central axis CL as the inclined surface 30Ba and the guide surface 54a extend downward. During inversion working, the second punch 30B is pushed downward by a pushing jig J, the inclined surface 30Ba comes into contact with the guide surface 54a, and the inclined surface 30Ba is guided by the guide surface 54a. Accordingly, the second punch 30B moves diagonally inward in the radial direction and downward.

In the second step, due to such movement of the second punch 30B, as shown in FIG. 8(a), the hook portion 52 is hooked onto the outer flange portion 13, and the outer flange portion 13 is drawn inward in the radial direction. In the hooking operation, the hook portion 52 comes into contact with an inner surface of the outer flange portion 13. In parallel with the hooking operation, similarly to the fifth modification example, the inner flange portion 12 is pushed outward by the pushing member 51 on a radially inner side. Thereafter, as shown in FIG. 8(b), the second punch 30B moves straight downward, thereby completing the inversion working.

In the sixth modification example as well, similarly to the embodiment, the inversion working of the workpiece 10 can be satisfactorily performed. In addition, since the workpiece 10 is sandwiched between the second punch 30B and the second die 40B by hooking the hook portion 52 onto the workpiece 10, the workpiece 10 easily slides on the second die 40B in the second step, so that satisfactory inversion working can be realized.

Figure 9:
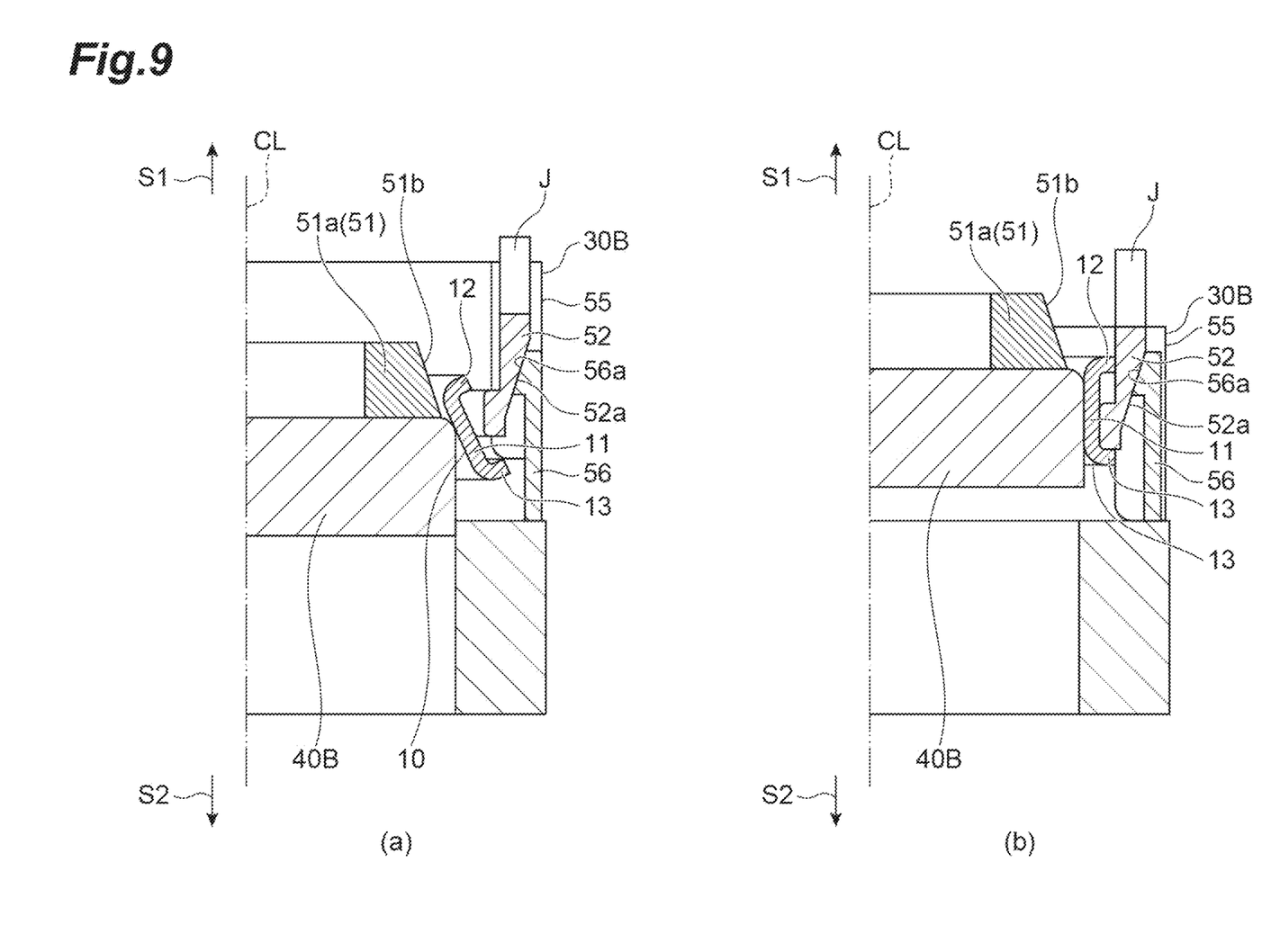
FIGS. 9(a) and 9(b) are cross-sectional views for describing a second step of a seventh modification example.

FIG. 9 is a cross-sectional view for describing a second step of a seventh modification example. The seventh modification example is the same as the sixth modification example except for points to be described below. In the seventh modification example, a contact surface 51b of the pushing member 51 with the workpiece 10 is inclined with respect to the axial direction to be further away from the central axis CL as the contact surface 51b extends toward the lower side (second side S2). In addition, in the seventh modification example, the second punch 30B includes an annular member 55; the hook portion 52 that is movable with respect to the annular member 55; and a guide member 56 that guides the movement of the hook portion 52. The annular member 55 is formed of, for example, one member formed in an annular shape in a plan view.

The hook portion 52 has an inclined surface 52a, and the guide member 56 has an inclined guide surface 56a. The inclined surface 52a and the guide surface 56a are inclined to approach the central axis CL as the inclined surface 52a and the guide surface 56a extend downward. During inversion working, as shown in FIG. 9(a), the hook portion 52 is pushed downward by the pushing jig J, the inclined surface 52a is guided by the guide surface 56a, and the hook portion 52 moves diagonally inward in the radial direction and downward. Accordingly, the hook portion 52 protrudes from the annular member 55. In parallel with the protruding operation, the inner flange portion 12 is pushed outward by the pushing member 51 on the radially inner side. Thereafter, as shown in FIG. 9(b), a tip portion 52b of the hook portion 52 is hooked onto the outer flange portion 13, and pushes the inner surface of the outer flange portion 13 downward. Accordingly, the inversion working is completed.

In the seventh modification example as well, similarly to the embodiment, the inversion working of the workpiece 10 can be satisfactorily performed. In addition, since the workpiece 10 is sandwiched between the second punch 30B and the second die 40B by hooking the hook portion 52 onto the workpiece 10, the workpiece 10 easily slides on the second die 40B in the second step, so that satisfactory inversion working can be realized. Incidentally, in the sixth modification example and the seventh modification example, the pushing member 51 may be omitted.

The present disclosure is not limited to the embodiment and the modification examples. For example, the material and shape of each configuration are not limited to the material and shape described above, and various materials and shapes can be adopted. The workpiece 10 may have any shape, and may include, for example, only the workpiece body portion 11 without including the inner flange portion 12 and the outer flange portion 13.

The ring member 20 may be, for example, an outer ring member that can be used as an outer ring of a bearing. In this case, the manufactured ring member 20 itself may be used as an outer ring, or an outer ring may be manufactured by further processing the ring member 20. When the ring member 20 is an outer ring member, the main body portion 21 has the raceway surface 21a facing the inside in the radial direction, and the pair of flange portions 22 and 23 extend inward in the radial direction from the main body portion 21. In the first step, the workpiece 10 is deformed to stand up toward the inside in the radial direction, and in the second step, the workpiece 10 is deformed such that the surface 11a of the workpiece body portion 11 faces the inside in the radial direction. In this case as well, the workpiece 10 is deformed by the inversion step such that the workpiece body portion 11 has a cylindrical shape. In this case, the first punch body portion 31A and the second punch body portion 31B may be formed in a substantially columnar shape, and the first die body portion 41A and the second die body portion 41B may be formed in a substantially cylindrical shape.

In the embodiment, the workpiece 10 is sandwiched between the punch and the die by bringing the punch closer to the die; however, the punch and the die may be moved relative to each other, for example, the workpiece 10 may be sandwiched between the punch and the die by moving the punch and the die to approach each other.

REFERENCE SIGNS LIST

10: workpiece, 11: workpiece body portion, 11a: surface, 12: inner flange portion, 13: outer flange portion, 20: ring member (bearing ring member), 30A: first punch, 30B: second punch, 40A: first die, 41A: first die body portion, 40B: second die, 41B: second die body portion, 45A: first die R surface, 45B: second die R surface, 46: inclined surface, 47A: first contact surface, 47B: second contact surface, 51: pushing member, 52: hook portion, S1: first side, S2: second side.

The invention claimed is:

1. A method for manufacturing a bearing ring member, the method comprising:
   an inversion step of sandwiching a workpiece including a workpiece body portion having an annular shape between one or more punches disposed on a first side in an axial direction and a plurality of dies disposed on a second side opposite to the first side, and deforming the workpiece using the one or more punches and the plurality of dies such that the workpiece body portion has a cylindrical shape,
   wherein the inversion step includes, in the following order, a first step of deforming the workpiece using a first die of the plurality of dies in a state where no sliding occurs between the workpiece and the first die, and a second step of deforming the workpiece using a second die of the plurality of dies in a state where a sliding occurs between the workpiece and the second die, and
   a bending moment acting on the workpiece in the first step is smaller than a predicted value M of a limiting bending moment of the workpiece body portion calculated by Formula (1), $$M = \frac{W_W \times t^2}{4} Y \qquad (1)$$

where $W_W$ is a width of the workpiece body portion, t is a thickness of the workpiece body portion, and Y is a yield stress of the workpiece body portion.

2. The method for manufacturing a bearing ring member according to claim 1,
   wherein the first die includes a first die R surface formed in a circular arc shape,
   the second die includes a second die R surface formed in a circular arc shape, and an inclined surface formed on the second side of the second die R surface and inclined with respect to the axial direction,
   in the first step, the first die R surface comes into contact with the workpiece, and
   in the second step, after the second die R surface comes into contact with the workpiece, the inclined surface comes into contact with the workpiece.

3. The method for manufacturing a bearing ring member according to claim 1,
   wherein the first die includes a first die body portion formed in a columnar shape,
   the second die includes a second die body portion formed in a columnar shape,
   in the first step, the workpiece is sandwiched between one punch of the one or more punches and the first die body portion,
   in the second step, the workpiece is sandwiched between the one punch and the second die body portion, and
   a diameter of the second die body portion is smaller than a diameter of the first die body portion.

4. The method for manufacturing a bearing ring member according to claim 1,
   wherein in the first step, the workpiece is sandwiched between one punch of the one or more punches and the first die in a state where a surface of the workpiece faces one of the first side and the second side, and in the second step, the workpiece is sandwiched between the one punch and the second die in a state where the surface of the workpiece faces the other of the first side and the second side.

5. The method for manufacturing a bearing ring member according to claim 1, wherein a surface roughness of a second contact surface of the second die which comes into contact with the workpiece in the second step is smaller than a surface roughness of a first contact surface of the first die which comes into contact with the workpiece in the first step.

6. The method for manufacturing a bearing ring member according to claim 1, wherein a Rockwell C scale hardness of a second contact surface of the second die which comes into contact with the workpiece in the second step is larger than a Rockwell C scale hardness of a first contact surface of the first die which comes into contact with the workpiece in the first step.

7. The method for manufacturing a bearing ring member according to claim 1, wherein in the second step, while the workpiece is sandwiched in the axial direction, the workpiece is pushed along a radial direction by a pushing member.

8. The method for manufacturing a bearing ring member according to claim 1, wherein in the second step, a hook punch including a hook portion is used, and the workpiece is sandwiched between the hook punch and the second die by hooking the hook portion onto the workpiece.

9. The method for manufacturing a bearing ring member according to claim 1, wherein the workpiece further includes an inner flange portion extending from a radially inner edge of the workpiece body portion toward one side in the axial direction, and an outer flange portion extending from a radially outer edge of the workpiece body portion toward the one side in the axial direction.

10. The method for manufacturing a bearing ring member according to claim 1,
wherein the first die includes a first die body portion formed in a columnar shape,
the second die includes a second die body portion formed in a columnar shape,
in the first step, the workpiece is sandwiched between a first punch of the one or more punches and the first die body portion,
in the second step, the workpiece is sandwiched between a second punch of the one or more punches and the second die body portion, and
a diameter of the second die body portion is smaller than a diameter of the first die body portion.

11. The method for manufacturing a bearing ring member according to claim 1,
wherein in the first step, the workpiece is sandwiched between a first punch of the one or more punches and the first die in a state where a surface of the workpiece faces one of the first side and the second side, and
in the second step, the workpiece is sandwiched between a second punch of the one or more punches and the second die in a state where the surface of the workpiece faces the other of the first side and the second side.

12. A method for manufacturing a bearing ring member using an inversion process, the method comprising:
sandwiching a workpiece including a workpiece body portion having an annular shape between one or more punches disposed on a first side in an axial direction and a plurality of dies disposed on a second side opposite to the first side;
deforming the workpiece a first time, while sandwiching the workpiece, using a first die of the plurality of dies in a state where no sliding occurs between the workpiece and the first die; and
deforming the workpiece a second time, while sandwiching the workpiece, using a second die of the plurality of dies in a state where a sliding occurs between the workpiece and the second die,
wherein a surface roughness of a second contact surface of the second die which comes into contact with the workpiece is smaller than a surface roughness of a first contact surface of the first die which comes into contact with the workpiece.

13. The method for manufacturing a bearing ring member according to claim 12, wherein the workpiece body portion has a cylindrical shape after the workpiece is deformed the second time.

14. The method for manufacturing a bearing ring member according to claim 12,
wherein during the first time that the workpiece is deformed, the workpiece is sandwiched between one punch of the one or more punches and the first die, and
during the second time that the workpiece is deformed, the workpiece is sandwiched between the one punch and the second die.

15. The method for manufacturing a bearing ring member according to claim 12,
wherein during the first time that the workpiece is deformed, the workpiece is sandwiched between a first punch of the one or more punches and the first die, and
during the second time that the workpiece is deformed, the workpiece is sandwiched between a second punch of the one or more punches and the second die.

16. The method for manufacturing a bearing ring member according to claim 12, wherein the second time the workpiece is deformed, a hook punch including a hook portion is used, and the workpiece is sandwiched between the hook punch and the second die by hooking the hook portion onto the workpiece.

17. The method for manufacturing a bearing ring member according to claim 12, wherein the workpiece further includes an inner flange portion extending from a radially inner edge of the workpiece body portion toward one side in the axial direction, and an outer flange portion extending from a radially outer edge of the workpiece body portion toward the one side in the axial direction.

18. A method for manufacturing a bearing ring member using an inversion process, the method comprising:
sandwiching a workpiece including a workpiece body portion having an annular shape between one or more punches disposed on a first side in an axial direction and a plurality of dies disposed on a second side opposite to the first side;
deforming the workpiece a first time, while sandwiching the workpiece, using a first die of the plurality of dies in a state where no sliding occurs between the workpiece and the first die; and
deforming the workpiece a second time, while sandwiching the workpiece, using a second die of the plurality of dies in a state where a sliding occurs between the workpiece and the second die,
wherein a Rockwell C scale hardness of a second contact surface of the second die which comes into contact with the workpiece is larger than a Rockwell C scale hardness of a first contact surface of the first die which comes into contact with the workpiece.

19. The method for manufacturing a bearing ring member according to claim 18,
wherein during the first time that the workpiece is deformed, the workpiece is sandwiched between one punch of the one or more punches and the first die,
during the second time that the workpiece is deformed, the workpiece is sandwiched between the one punch and the second die, and
the workpiece body portion has a cylindrical shape after the workpiece is deformed the second time.

20. The method for manufacturing a bearing ring member according to claim 18,
wherein during the first time that the workpiece is deformed, the workpiece is sandwiched between a first punch of the one or more punches and the first die,
during the second time that the workpiece is deformed, the workpiece is sandwiched between a second punch of the one or more punches and the second die, and
the workpiece body portion has a cylindrical shape after the workpiece is deformed the second time.

* * * * *